United States Patent
Naveh et al.

(10) Patent No.: US 12,450,512 B2
(45) Date of Patent: Oct. 21, 2025

(54) CONTROLLED PROPAGATION OF INPUT VALUES IN QUANTUM COMPUTING

(71) Applicant: Classiq Technologies LTD., Tel Aviv (IL)

(72) Inventors: Amir Naveh, Haifa (IL); Shmuel Ur, Shorashim (IL)

(73) Assignee: Classiq Technologies LTD., Tel Aviv (IL)

( * ) Notice: Subject to any disclaimer, the term of this patent is extended or adjusted under 35 U.S.C. 154(b) by 935 days.

(21) Appl. No.: 17/649,576

(22) Filed: Feb. 1, 2022

(65) Prior Publication Data

US 2023/0244973 A1    Aug. 3, 2023

(51) Int. Cl.
*G06N 10/20*    (2022.01)

(52) U.S. Cl.
CPC ................... *G06N 10/20* (2022.01)

(58) Field of Classification Search
CPC ....................................... G06N 10/20
See application file for complete search history.

(56) References Cited

U.S. PATENT DOCUMENTS

| | | | |
|---|---|---|---|
| 11,119,773 B1* | 9/2021 | Soeken | G06F 15/82 |
| 12,204,879 B2* | 1/2025 | Shi | G06F 8/41 |
| 2017/0147303 A1* | 5/2017 | Amy | G06F 8/436 |
| 2018/0181685 A1* | 6/2018 | Roetteler | H04L 9/0643 |
| 2020/0242207 A1* | 7/2020 | Shehab | G06F 30/30 |

FOREIGN PATENT DOCUMENTS

CN    112884155 A  *  6/2021  ............. G06N 10/00

OTHER PUBLICATIONS

"Quantum Computing", published on Nov. 27, 2018 to https://igaller.github.io/CS4850/quantuminfo/qinfo.html, retrieved Jul. 24, 2025. (Year: 2018).*

N. Khammassi, etc., "OpenQL: A Portable Quantum Programming Framework for Quantum Accelerators", published in Dec. 2021 to https://dl.acm.org/doi/fullHtml/10.1145/3474222, retrieved Jul. 24, 2025. (Year: 2021).*

(Continued)

*Primary Examiner* — Shourjo Dasgupta
(74) *Attorney, Agent, or Firm* — Tutunjian & Bitetto, P.C.

(57) ABSTRACT

A method, product and apparatus for controlled propagation of input values in quantum computing. The method comprises obtaining a quantum program to be compiled. The quantum program has a first input qubit having a first value and a second input qubit having a second value. The method comprises identifying an intermediate cycle after which the first input qubit is not used in the quantum program, synthesizing a transformative quantum program that is applicable on a qubit being processed based on the first value and based on the second value; and updating the quantum program which comprises: modifying the quantum program to perform the transformative quantum program on the first input qubit at the intermediate cycle; and causing the quantum program to utilize the first input qubit instead of the second input qubit.

18 Claims, 3 Drawing Sheets

(56) References Cited

OTHER PUBLICATIONS

Yonghshan Ding, etc., "SQUARE: Strategic Quantum Ancilla Reuse for Modular Quantum Programs via Cost-Effective Uncomputation", published via 2020 ACM/IEEE 47th Annual International Symposium on Computer Architecture (ISCA), retrieved Jul. 24, 2025. (Year: 2020).*

Yuval R. Sanders, etc., "Compilation of Fault-Tolerant Quantum Heuristics for Combinatorial Optimization", published via PRX Quantum 1, 020312 (2020), retrieved Jul. 24, 2025. (Year: 2020).*

International Search Report from PCT/IL2023/050037 Apr. 19, 2023, 9 pgs.

Paul Nation and Blake Johnson—"How to Measure and Reset a Qubit in the Middle of a Circuit Execution", https://www.ibm.com/blogs/research/2021/02/quantum-mid-circuit-measurement/, Feb. 11, 2021. Archived also at the following URL: https://web.archive.org/web/20220111064734/https://www.IBM.com/blogs/research/2021/02/quantum-mid-circuit-measurement/.

Das, Poulami, et al. "Adapt: Mitigating Idling Errors in Qubits via Adaptive Dynamical Decoupling." MICRO-54: 54th Annual IEEE/ACM International Symposium on Microarchitecture. 2021.

\* cited by examiner

CONTROLLED PROPAGATION OF INPUT VALUES IN QUANTUM COMPUTING

TECHNICAL FIELD

The present disclosure relates to quantum computing in general, and to compilation of quantum circuits, in particular.

BACKGROUND

Quantum computing is a computational paradigm that is fundamentally different from classic computing. Classic computing is based on the manipulation of states, defined by a bit string of "0" and "1". These states are logically altered by fundamental operations, or logical Boolean gates (e.g. NOT, AND, NAND etc.), to perform certain tasks. Quantum computing, on the other hand, is based on the manipulation of quantum states, defined by a complex vector with norm 1, also referred to as a density matrix. The length of this vector is 2 to the power of the number of qubits-a physical realization of a two-state system. These states are altered by unitary matrices of the appropriate size, namely the vector length squared. Such matrices can be decomposed by a product of matrices, each a tensor product of 2×2 and 4×4 matrices. In some cases, a quantum computer may be universally programed using a limited sized matrices. For example, the quantum program may be programmed using only 2×2 and 4×4 matrices (and even more specifically, a small set of such matrices will suffice). Using such matrices to control the state of a quantum computer is referred to as "gate level programming". In some cases, other matrices may be used. For example, 8×8 matrices may be utilized (e.g., Toffoli gates).

In quantum software, programming is done at the gate-level or near gate level. Quantum programming software and frameworks, such as Qiskit, CIRQ, Q#, FOREST, braket, silq, all allow user friendly interfaces for gate level programming. Additionally, quite a few building blocks and algorithms exist that perform certain pre-defined functionalities.

BRIEF SUMMARY

One exemplary embodiment of the disclosed subject matter is a method comprising: obtaining a quantum program to be compiled, wherein the quantum program comprising a first input qubit having a first value and a second input qubit having a second value; identifying an intermediate cycle after which the first input qubit is not used in the quantum program; synthesizing a transformative quantum program that is applicable on a qubit being processed, wherein said synthesizing is based on the first value and based on the second value, whereby performing controlled propagation on the qubit being processed having the first value and updating the qubit being processed to have the second value; updating the quantum program, wherein said updating the quantum program comprises: modifying the quantum program to perform the transformative quantum program on the first input qubit at the intermediate cycle; and causing the quantum program to utilize the first input qubit instead of the second input qubit.

Another exemplary embodiment of the disclosed subject matter is a non-transitory computer readable medium retaining program instructions, wherein the program instructions are configured, when read, to cause a processor to perform: obtaining a quantum program to be compiled, wherein the quantum program comprising a first input qubit having a first value and a second input qubit having a second value; identifying an intermediate cycle after which the first input qubit is not used in the quantum program; synthesizing a transformative quantum program that is applicable on a qubit being processed, wherein said synthesizing is based on the first value and based on the second value, whereby performing controlled propagation on the qubit being processed having the first value and updating the qubit being processed to have the second value; updating the quantum program, wherein said updating the quantum program comprises: modifying the quantum program to perform the transformative quantum program on the first input qubit at the intermediate cycle; and causing the quantum program to utilize the first input qubit instead of the second input qubit.

Yet another exemplary embodiment of the disclosed subject matter is an apparatus comprising a processor and memory unit, wherein the processor is configured to perform: obtaining a quantum program to be compiled, wherein the quantum program comprising a first input qubit having a first value and a second input qubit having a second value; identifying an intermediate cycle after which the first input qubit is not used in the quantum program; synthesizing a transformative quantum program that is applicable on a qubit being processed, wherein said synthesizing is based on the first value and based on the second value, whereby performing controlled propagation on the qubit being processed having the first value and updating the qubit being processed to have the second value; updating the quantum program, wherein said updating the quantum program comprises: modifying the quantum program to perform the transformative quantum program on the first input qubit at the intermediate cycle; and causing the quantum program to utilize the first input qubit instead of the second input qubit.

Optionally, the transformative quantum program is a quantum program that is configured to update a value of the qubit being processed by subtracting from the qubit being processed the first value and by adding to the qubit being processed the second value.

Optionally, the disclosed subject matter further comprises verifying that the first value and the second value have a same computational base.

Optionally, said identifying comprises determining that the quantum program does not define a computation on the second input qubit having the second value at a cycle prior to the intermediate cycle, wherein said causing the quantum program to utilize the first input qubit instead of the second input qubit comprises replacing usage of the second input qubit by the first input qubit.

Optionally, said identifying comprises determining that a computation on the second input qubit having the second value at a cycle prior to the intermediate cycle can be delayed to a delayed cycle after the intermediate cycle; wherein said causing the quantum program to utilize the first input qubit instead of the second input qubit comprises updating the quantum program to perform the computation at the delayed cycle and using the first input qubit instead of the second input qubit.

Optionally, the disclosed subject matter further comprises generating an executable quantum circuit based on the updated quantum program.

Optionally, the disclosed subject matter further comprises executing the executable quantum circuit using a quantum computer, whereby reducing qubit resources allocated for the quantum program when executed by the quantum computer.

Optionally, said updating is configured to remove all usages of the second input qubit from the quantum program, whereby reducing a number of logical qubits defined by the quantum program.

Optionally, the first input qubit is an input to a first functional block in the quantum program, wherein the second input qubit is an input to a second functional block in the quantum program.

Optionally, the disclosed subject matter further comprises verifying that the first input qubit is not entangled in the intermediate cycle with any other qubit of the quantum program.

Optionally, the first input qubit comprises a first set of qubits, wherein the second input qubit comprises a second set of qubits.

Optionally, the disclosed subject matter further comprises verifying that the first set of qubits is not entangled with any other qubit of the quantum program that is not comprised by the first set of qubits.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
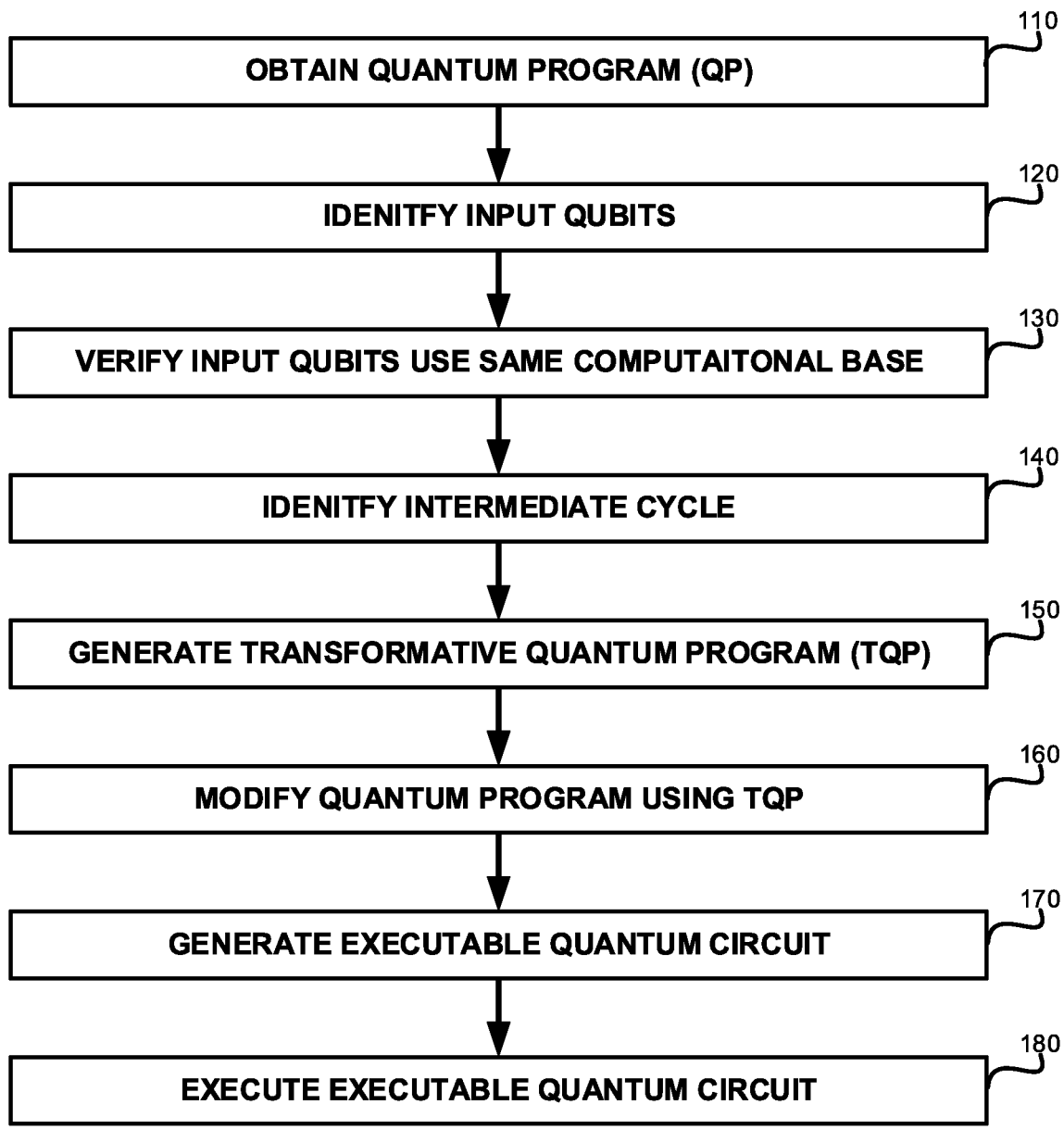
FIG. 1 shows a flowchart diagram of a method, in accordance with some exemplary embodiments of the disclosed subject matter.

One technical problem dealt with by the disclosed subject matter is reducing amount of physical qubits required to execute a quantum program. In some cases, it may be desired to reduce the number of qubits, even if such a reduction is part of a trade-off that involves an increase in the number of cycles to the quantum program.

Operations in quantum programs, as a rule, should be reversible. Setting a value to a variable, mid-program, may not be a reversible operation. A technical solution for enabling setting a value of a variable without destroying desirable properties of the quantum program may be desired.

One technical solution is to reuse an input qubit to hold an additional input value mid-program. Input values are known in advance, and can be used in compilation to synthesize a specific transformative quantum program based thereon to replace the first initial input value with a second value, mid-program, while adhering to the reversible operation property.

In some cases, such reuse may be applicable in case that the first and second values are in the same computational base.

In some exemplary embodiments, the transformative quantum program may be generated during the compilation of the quantum program, yielding an executable quantum circuit using a smaller number of qubits.

In some exemplary embodiments, during compilation, an intermediate cycle may be identified. The intermediate cycle may be a cycle after the quantum program has commenced (i.e., after the initial, first, cycle). The intermediate cycle may be characterized in that the initial value of the first qubit is no longer used in the quantum program. Hence, the first qubit may be reused after the intermediate cycle. In some cases, the intermediate cycle may be characterized in that the second value is never used in the quantum program before the intermediate cycle or each such usage can be delayed after the intermediate cycle.

It is noted that if the first value and the second values are utilized within the same functional block to perform a single computation, it is less likely that such an intermediate cycle can be identified. However, in case of inputs used by different functions, for different computations, it is likely that even if the second value is used before the last usage of the first value, such usage can be delayed to a later cycle.

In some exemplary embodiments, a transformative quantum program synthesized. The synthesis may be based on the first value and the second value. The transformative quantum program may be configured to modify the value of the qubit from V1 to V2, while holding the reversibility property. In some cases, the transformative quantum program may be applicable on a qubit having a value of V1 and may be configured to subtract therefrom the value of V1−V2, add thereto the value of V2−V1, or the like. In some exemplary embodiments, the transformative quantum program may implement controlled propagation operation disclosed in U.S. application Ser. No. 17/354,504, entitled "CONTROLLED PROPAGATION IN QUANTUM COMPUTING", filed Jun. 22, 2021, which is hereby incorporated by reference in its entirety for all purposes without giving rise to disavowment.

The quantum program may be updated to introduce the transformative quantum program, and to free up the use of the second qubit that originally held the second value, by using the first qubit instead after the controlled propagation operation was performed. For example, instead of using the second qubit, the first qubit can be used. Additionally, or alternatively, in case where some usages of the second value need to be delayed, such delay may also be implemented in the quantum program, In some exemplary embodiments, the first qubit may be an input qubit having a known pre-defined initial value. Additionally, or alternatively, the second qubit may be an input qubit having a known pre-defined initial value. However, in some embodiments, the qubits may not necessarily be input qubits. As an example, the second qubit may be a qubit whose value is computed mid-program. In such a case, partial execution of the program until reaching the mid-program may be performed a plurality of times in order to determine the value of the second qubit, such as using quantum tomography, density matrix reconstruction, or the like, such as disclosed in U.S. application Ser. No. 17/354,504, entitled "CONTROLLED PROPAGATION IN QUANTUM COMPUTING", filed Jun. 22, 2021 and in U.S. application Ser. No. 17/648,691, entitled "AUXILIARY QUBITS ANALYSIS BASED ON PARTIAL COMPILATION", filed Jan. 24, 2022, both of which are hereby incorporated in their entirety for all purposes without giving rise to disavowment.

In some exemplary embodiments, it is noted that in accordance with the disclosed subject matter, the first qubit may be a single qubit or a set of qubits. Similarly, the second qubit may be a single qubit or a set of qubits. In some exemplary embodiments, the set of qubits that are processed together may or may not be entangled with one another. In some cases, the sets of qubits may have the same number of qubits, e.g., the first set of qubits, representing the first input qubit, may consist N qubits, and the second set of qubits, representing the second input qubit, may also consist N qubits. In some cases, the sets may comprise a same number of logical qubits, which may be represented using a different number of physical qubits in the quantum computer when the quantum program is being executed. For the clarity of disclosure, the disclosed subject matter is hereinbelow explained in detail when relating to a single first qubit and a single second qubit. However, it would be understood that the disclosed subject matter is applicable over sets of qubits that may be processed together, taking the role of the first qubit, the role of the second qubit, or the like.

One technical effect of utilizing the disclosed subject matter is to free up qubits from the quantum program. Qubits may be valuable resource in quantum computing and may represent one of the most expensive and unavailable resources. Reduction in the number of qubits may be important in order to enable execution of quantum programs using available quantum computers, that have limited number of qubits. Additionally, or alternatively, even if there are physical qubits available, such qubits may be put to use to represent logical qubits to implement quantum error correction. Hence, reusing the same logical qubit, and accordingly, the same physical qubit(s), may improve performance and accuracy of the quantum program.

Another technical effect of utilizing the disclosed subject matter is to leverage functional level information to identify potentially re-usable qubits.

The disclosed subject matter may provide for one or more technical improvements over any pre-existing technique and any technique that has previously become routine or conventional in the art. Additional technical problems, solutions, and effects may be apparent to a person of ordinary skill in the art in view of the present disclosure.

Referring now to FIG. 1 showing a flowchart diagram of a method, in accordance with some exemplary embodiments of the disclosed subject matter.

On Step 110, a quantum program is obtained. The quantum program may be provided in any digital form, including but not limited to a Directed Acyclic Graph (DAG) representation of gates, a DAG representation of functional blocks, a quantum circuit design, a gate-level representation, a functional-level representation, or the like. In some exemplary embodiments, a quantum program may be constructed out of layers. Each layer may be a tensor product of a certain fixed set of gates. A quantum program may be a matrix, defined by a product of layers $L_1 \cdot L_2 \cdot \ldots \cdot L_d$. The number of layers d may be referred to as the depth of the circuit. In some exemplary embodiments, a quantum program over n qubits may be a unitary operator $U_n$. In some exemplary embodiments, $U_n$ may be a matrix of $2^n \cdot 2^n \cdot U_n$ may be a unitary matrix, a matrix that is if multiplied by a vector with norm of 1, outputs a vector with norm of 1. In some cases, a unitary matrix may be a quantum program, in which unitary operations (gates) are applied on the qubits. Additionally, or alternatively, valid quantum state, denoted as $\psi$, may be a vector of size $2^n$ with a norm of 1. The execution of the quantum program may be the multiplication of the state $\psi$ by the unitary matrix $U_n$, resulting in an output state. It is noted that the gates may comprise logical gates (e.g., AND, OR, XOR, or the like), qubit gates (e.g., $U_3(\theta, \phi, \lambda)$ gate, Hadamard gate (H), controlled not gate (CX, CNOT), controlled Z gate (CZ), toffoli gate, swap gate, phase shift gate ($R_\phi$), Pauli-X gate (X), Pauli-Y gate (Y), Pauli-Z gate (Z), or the like), or the like.

In some exemplary embodiments, the quantum program may define one or more functional blocks. A functional block may be a logical abstraction of a sub-circuit having a predetermined functionality. In some exemplary embodiments, the functional block may represent a sub-circuit that is executed over two or more cycles, using two or more qubits, using two or more quantum gates, or the like. In some cases, in addition to the one or more function blocks, the functional-level program may or may not include one or more gate-level components such as gates. For example, a high level quantum program may support the function add(a,b,c), which places the sum of states of the input qubits 'a' and 'b' into the output qubit 'c'. As other examples, the function-level program may comprise directly quantum 1-qubit gates, 2-qubit gates, or the like, such as but not limited to identity gates, Pauli gates, square root of NOT gates, controlled gates, CNOT gates, CX gates, CY gates, CZ gates, phase shift gates, controlled phase shift gates, Hadamard gates, swap gates, Toffoli gates, or the like.

On Step 120, input qubits may be identified. In some cases, an input qubit may be a qubit providing a value to a program, such as providing an input value in the initial cycle. Additionally, or alternatively, an input qubit may be a qubit providing a value to a functional block. In some exemplary embodiments, on Step 120, two input qubits may be identified-a first input qubit whose is to be reused and a second input qubit who may be freed up by using the first input qubit to hold the value of the second input qubit. In some exemplary embodiments, the first input qubit and the second input qubit may be input qubits of different functional blocks. In such a case, the values of the two input qubits may not be used at the same time, may not depend on one another, or the like.

On Step 130, it may be verified that both input qubits use the same computational base. In some exemplary embodiments, the computational base may be defined by the distinct quantum states that each qubit can be in physically. In some exemplary embodiments, if qubits are encoded into the polarization of single photons, the computational base may be the basis formed by the horizontal and vertical polarization states of the photon; if the qubits are encoded into the spins of ions, atoms or electrons, then the computational base may be the basis of the spin angular momentum the vertical direction; if a qubit is encoded into the presence or absence of a photon in a given mode, then the computational base may be the occupational state of that mode. The above are merely general examples of different computational bases that can be used. Different qubits may use different computational bases and it may be desired to verify that the two selected input qubits have the same computational basis so as to ensure that the disclosed subject matter yields expected results.

On Step 140, an intermediate cycle is identified. The intermediate cycle may be a cycle after which the value of the first input qubit is no longer used. For example, the intermediate cycle may be a cycle after the end of the functional block which receives the first input qubit. In some exemplary embodiments, it may verified that the first input qubit is not entangled with other qubits. In some cases, a sect of first input qubits may be entangled with each other, while not entangled with qubits external to the set of first input qubits and still be utilized in accordance with the disclosed subject matter. In some exemplary embodiments, entanglement may be determined using a simulator, using partial compilation and multiple executions of the partially compiled circuit and using tomography, using full compilation and multiple partial executions of the compiled circuit and using tomography, or the like. Additionally, or alternatively, the intermediate cycle may be a cycle before the value of the second input qubit is being used. In some cases, in the original representation of the quantum program, the value of the second input qubit may be used before the intermediate cycle, however such usage may be delayed and postponed to a later cycle. In some cases, the functional block in which the second input qubit is used can be delayed and postponed after the conclusion of the functional block in which the first input qubit is used. In some exemplary embodiments, the change of the timing of functional block or of the usage of the second input qubit may be performed, for example, using the techniques described in U.S. patent application Ser. No. 17/450,584, entitled "FUNCTIONAL-LEVEL PROCESSING COMPONENT FOR QUANTUM COMPUTERS", filed Oct. 12, 2021, which is hereby incorporated for all purposes in its entirety for all purposes without giving rise to disavowment.

On Step 150, a Transformative Quantum Program (TQP) may be generated. The TQP may be a quantum program snippet that is configured to modify the value of a qubit upon which the TQP is being applied from a predetermined first value to a predetermined second value. In some exemplary embodiments, the TQP may be synthesized based on actual specific values of the quantum program, introducing specific data into the quantum program. In some exemplary embodiments, the TQP may be configured to transform a qubit retaining a first value to retain a second value, such as modifying the value of the first input qubit from a first value to a second value of the second input qubit. As an example, TQP may update the value of a single qubit or a set of qubits, denoted $q_1$, from $v_1$ to $v_2$, where $v_2$ is the value of the second qubit (or set of qubits), denoted $q_2$, by computing $q_1=q_1-v_1+v_2$. As can be appreciated, the TQP utilizes known specific data $(v_1,v_2)$, and does not rely on variables to pass such information, rather it is represented within its gates.

In some exemplary embodiments, the TQP may be computed in accordance with the following scheme. Assume we begin with a pure state $\varphi_1$, and we wish to create a quantum sub circuit (the TQP) that takes $\varphi_1$ to $\varphi_2$. $U_1$ may be a unitary that takes $\varphi_1$ and transforms it into the zero state |00 . . . 0⟩. $U_2$ may be a unitary that takes the zero state |00 . . . 0⟩ and transforms it into $\varphi_2$. Accordingly, given state $\varphi_1$, state $\varphi_2$ can be computed as follows: $\varphi_2=U_2U_1\varphi_1$. Put differently, the TQP can be based on $U=U_2U_1$. U may be decomposed to primitive gates, using known methods, to synthesize the desired circuit, TQP.

In some exemplary embodiments, $U_2$ can be built as follows. The first column of the matrix $U_2$ may be set to be $\varphi_2$. The matrix $U_2$ may be completed into a unitary matrix. In some exemplary embodiments, this can be achieved by filling the next columns of $U_2$ with random complex numbers to receive the matrix and perform ortho-normalization of the columns of the matrix, using the Gram-Schmidt method. After this process $U_2$ is unitary, and is configured to receive the zero state and calculate state $\varphi_2$.

In some exemplary embodiments, $U_1$ can be built using a similar technique by creating the matrix that receives the zero state and calculates state $\varphi_1$. $U_1$ may be the inverse of the calculated matrix. Inversing the matrix may be performed by decomposing the matrix to basic gates and then synthesizing a circuit in which the gate order is reversed and each gate is inversed.

In some cases, transition between quantum states may be implemented without the use of any auxiliary qubits. Additionally, or alternatively, in some cases, such as for example in mixed quantum states, the transition may require the usage of auxiliary qubits. In some exemplary embodiments, the TQP may utilize more qubits than the program itself utilizes. Additionally, or alternatively, the TQP may require to allocate a new auxiliary qubit to be utilized for its operation.

On Step 160, the quantum program may be modified using the TQP. In some exemplary embodiments, the TQP may be inserted into the quantum program, thereby creating a modified quantum program. The TQP may be inserted so as to add to the target qubit ($q_1$) the difference value of $v_2-v_1$. In some exemplary embodiments, the modified quantum program may be configured to update the value of $q_1$ to be $q_1=q_1-v_1+v_2$. As $q_1$, is valued $v_1$, $q_1$ is updated to be $q_1=v_1-v_1+v_2=v_2$. It is noted that the input qubit may be known to preserve its value. Additionally, or alternatively, input qubits may preserve their value of the entire quantum program. Additionally, or alternatively, input qubits may known to not be modified by the functional block that uses it. In some exemplary embodiments, in case the value of the qubit is needed again elsewhere (e.g., another functional block in a later cycle), the original value of $q_1$ can be restored using an uncompute block, using an inverse TQP, denoted $TQP^{-1}$, by computing explicitly $q_1=q_1-v_2+v_1$, or the like. It is noted that as the TQP hold the reversible operation property, its application can be reversed.

In some exemplary embodiments, the quantum program is modified to execute the TQP at the intermediate cycle and to use the first qubit ($q_1$) instead of the second qubit ($q_2$) after the intermediate cycle. In some exemplary embodiments, the quantum program is further modified to replace a usage of the second qubit before the intermediate cycle to a usage of the first qubit after the intermediate cycle, such as by postponing the execution of the functional block in which the second qubit is utilized, postponing the cycle in which the gate which operates on the second qubit is executed, or the like.

In some exemplary embodiments, as usage of the second qubit is replaced by the first qubit, the modified quantum program may free the second qubit, and avoid using it. In some exemplary embodiments, the second qubit may be freed up and not be allocated for the quantum program, thereby reducing number of qubits needed by the quantum program. Freeing up the second qubit may be leveraged to improve the operation of the quantum program without reducing the qubit resources utilized thereby, such as by using the second qubit as an auxiliary qubit that supports the operation of the quantum program, improves accuracy, precision, performance, or the like.

On Step 170, an executable quantum circuit is generated based on the modified quantum program created on Step 160. In some exemplary embodiments, the executable quantum circuit may be generated by compiling the modified quantum program. In some exemplary embodiments, the modified quantum program may be translated from a gate-level or functional-level representation of a quantum circuit to an executable quantum circuit. In some exemplary embodiments, the executable quantum circuit may comprise a machine representation that can be executed by a quantum hardware compiler, a logical program circuit that can be executed by a classic computer, or the like. The compilation may translate the circuit in a direct manner (e.g., replacing functional blocks by gate-level representation), may be hardware-specific (e.g., replace logical gates with existing physical gates of the target hardware), may introduce optimizations (e.g., reorder gates or circuits), may select representation for logical qubits (e.g., select which physical qubit(s) will represent each logical qubit in the quantum program), or the like.

On Step 180, the executable quantum circuit may be executed. The execution may be performed using a quantum computer. Additionally, or alternatively, the execution may be a simulated execution by a simulator of a quantum computer. In some exemplary embodiments, the executable quantum circuit may be executed multiple times, such as in order to collect statistics, to perform measurements over different executions, to perform quantum tomography, or the like.

Figure 2:
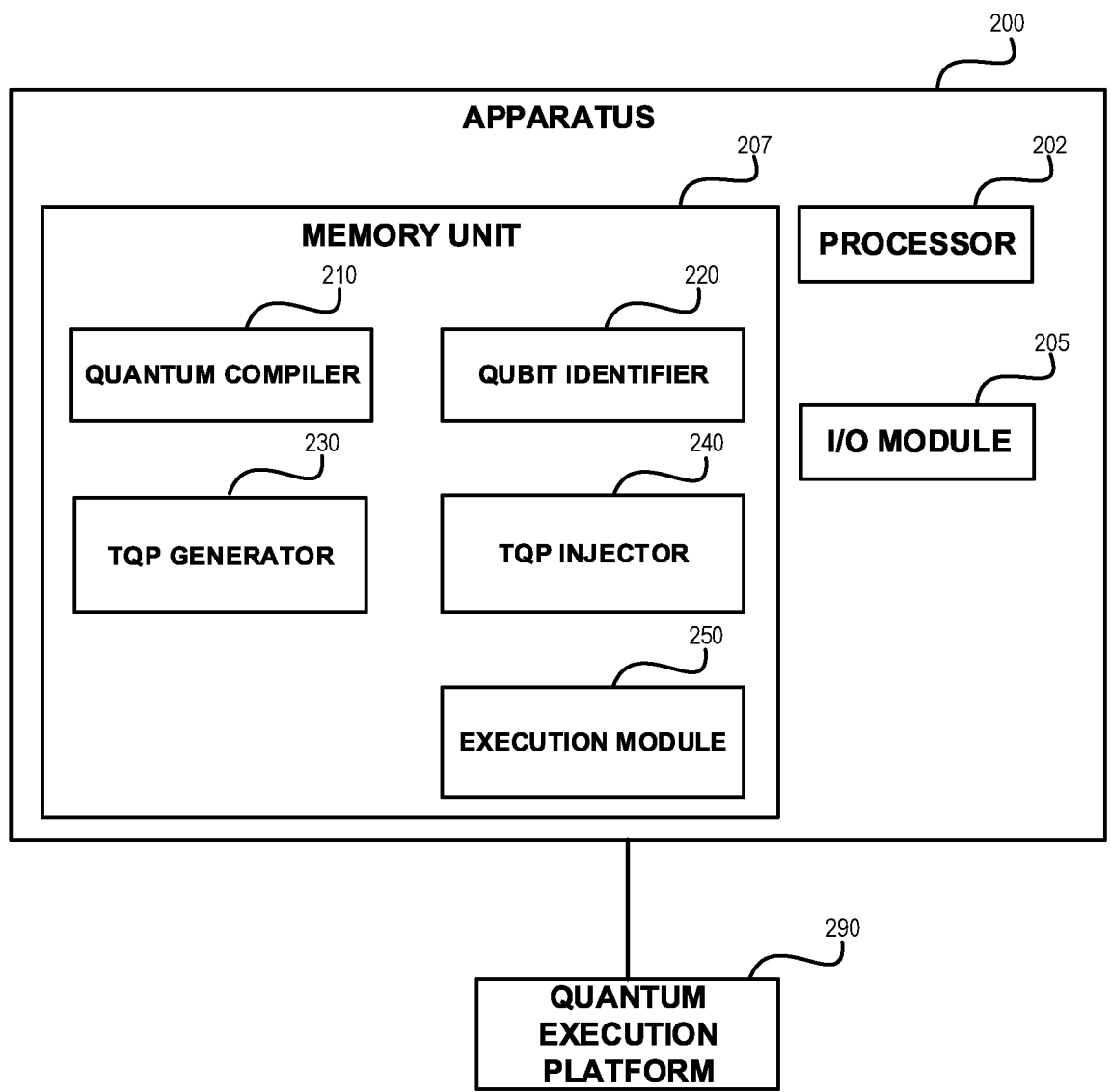
FIG. 2 shows a block diagram of an apparatus, in accordance with some exemplary embodiments of the disclosed subject matter.

Referring now to FIG. 2 showing a block diagram of an apparatus, in accordance with some exemplary embodiments of the disclosed subject matter. The apparatus of FIG. 2 may be configured to perform the steps of the method of FIG. 1.

In some exemplary embodiments, Apparatus 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of its subcomponents. It is noted that Processor 202 may be a traditional processor, and not necessarily, a quantum processor.

In some exemplary embodiments of the disclosed subject matter, Apparatus 200 may comprise an Input/Output (I/O) module 205. I/O Module 205 may be utilized to provide an output to and receive input from a user, such as, for example to obtain compilation instructions from a user, provide output to the user, indicating compilation outcome, providing output indicating execution outcome, or the like.

In some exemplary embodiments, Apparatus 200 may comprise Memory Unit 207. Memory Unit 207 may be a hard disk drive, a Flash disk, a Random-Access Memory (RAM), a memory chip, or the like. In some exemplary embodiments, Memory Unit 207 may retain program code operative to cause Processor 202 to perform acts associated with any of the subcomponents of Apparatus 200. Memory Unit 207 may comprise one or more components as detailed below, implemented as executables, libraries, static libraries, functions, or any other executable components.

In some exemplary embodiments, Quantum Compiler 210 may be configured to compile a quantum program into an executable quantum circuit. Quantum Compiler 210 may be hardware-specific. Additionally, or alternatively, Quantum Compiler 210 may be configured to compile a quantum program provided in a functional-level, using a high-level programming language, or the like. Additionally, or alternatively, Quantum Compiler 210 may be configured to transpile a quantum program to a gate-level representation. Additionally, or alternatively, Quantum Compiler 210 may be configured to introduce optimization during compilation, which may or may not be hardware dependent, depend on information available at the functional level, or the like.

In some exemplary embodiments, Qubit Identifier 220 may be configured to identify in the quantum program qubits to be processed in accordance with the disclosed subject matter. Qubit Identifier 220 may be configured to identify input qubits, such as the first input qubit, that can be reused. Additionally, or alternatively, Qubit Identifier 220 may be configured to identify qubits, such as the second input qubit, that can be freed up in accordance with the disclosed subject matter. In some exemplary embodiments, Qubit Identifier 220 may identify the intermediate cycle in which the first qubit is to be freed. Additionally, or alternatively, Qubit Identifier 220 may be configured to verify that the second input qubit is used only after the intermediate cycle, or that such usage can be deferred to a cycle after the intermediate cycle. Additionally, or alternatively, Qubit Identifier 220 may be configured to automatically search for qubits that serve as input qubits in different functional blocks. In some exemplary embodiments, Qubit Identifier 220 may automatically search for qubits that match the desired properties. Additionally, or alternatively, user input may be provided to provide hints, guides, or suggestions that may be verified by Qubit Identifier 220.

In some exemplary embodiments, TQP Generator 230 may be configured to generate a TQP based on the a-priori known values of the qubits identified by Qubit Identifier 220. In some exemplary embodiments, TQP Generator 230 may be configured to propagate, in a controlled manner, a value of a second qubit into a first qubit in a specific cycle, such as the intermediate cycle. In some exemplary embodiments, TQP Generator 230 may synthesize a TQP based on the value of the first qubit and based on the value of the second qubit. The quantum program may be updated by TQP Injector 240 to cause the TQP to be executed after the intermediate cycle. Additionally, or alternatively, TQP Injector 240 may be configured to free the second qubit identified by Qubit Identifier 220 after its value is propagated into the first qubit. Additionally, or alternatively, TQP Injector 240 may be configured to postpone the location in which the value of the second qubit is used to occur after the intermediate cycle so as to enable the replacement of the reference to the second qubit by a reference to the first qubit.

In some exemplary embodiments, Execution Module 250 may be configured to execute the quantum program on the target quantum computer, Quantum Execution Platform 290. In some exemplary embodiments, Execution Module 250 may be configured to execute the program once, and obtain the execution result, such as the output state provided by Quantum Execution Platform 290. Additionally, or alternatively, Execution Module 250 may be configured to execute the program multiple times and obtain multiple output results. The results may then be aggregated together, such as by creating an averaged output state, calculating a distribution function, or the like, which may be considered to be the output of the compiled quantum circuit. In some exemplary embodiments, Quantum Execution Platform 290 may be any platform capable of executing or simulating execution of an executable quantum circuit, including but not limited to quantum computer, a quantum computer simulator, or the like.

Figure 3A:
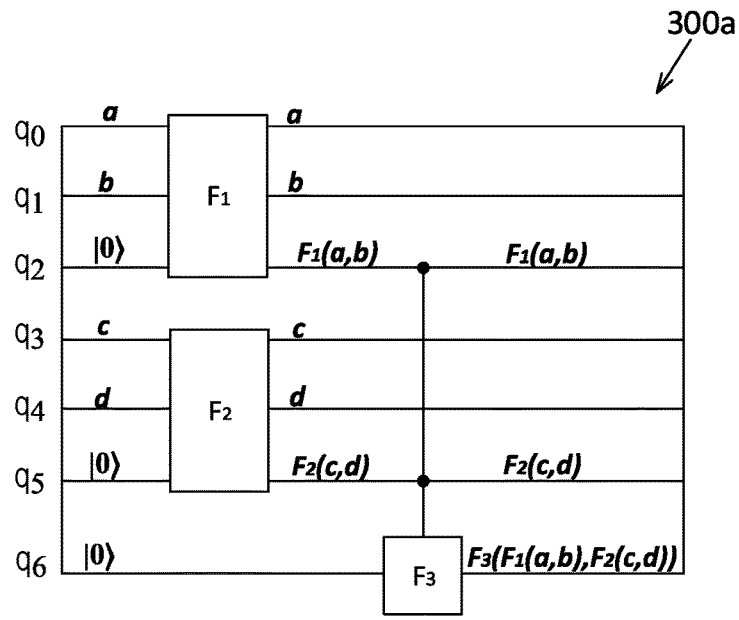
FIGS. 3A, 3B and 3C show illustration of quantum programs, in accordance with some exemplary embodiments of the disclosed subject matter.
Figure 3B:
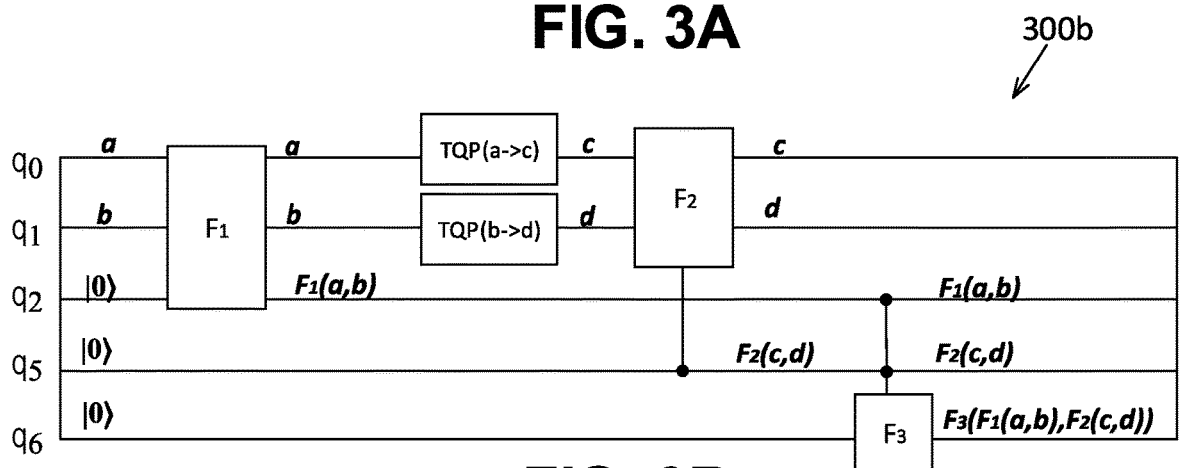
Figure 3C:
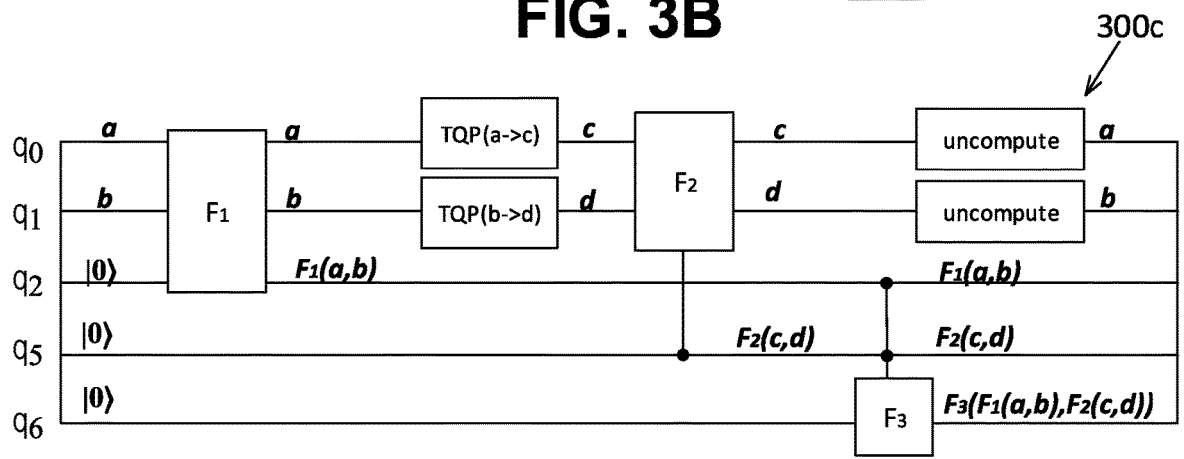

Referring now to FIGS. 3A, 3B and 3C showing illustration of quantum programs, in accordance with some exemplary embodiments of the disclosed subject matter.

Quantum Program (QP) 300a represents an original program. As can be appreciated, QP 300a uses seven qubits (denoted $q_0, q_1, \ldots, q_6$), manipulated by several functional blocks ($F_1, F_2, F_3$). Some of the qubits serve as input qubits to functional blocks (e.g., $q_0$ and $q_1$ with respect to $F_1$). Some of the qubits serve as auxiliary qubits (e.g., $q_2$ with respect to $F_1$). The value of each qubit at each cycle in which the value is changed is denoted on the figure itself at the initial cycle and after each functional block in which the qubit takes part. As an example, the value of $q_2$ is initially the zero state ($|0\rangle$) and is then modified to be $F_1(a, b)$ by the functional block $F_1$. The value remains also after $q_2$ is fed to $F_3$.

In accordance with the disclosed subject matter, input qubits $q_3$ and $q_4$ that are processed by $F_2$ can be freed and removed from the quantum program, as their value can be propagated in a controlled manner to $q_0$ and $q_1$, respectively. It is noted that in this example, two pairs of first and second qubits are processed: $q_0$ which is reused to retain the value of $q_3$, and $q_1$ which is reused to retain the value of $q_4$.

QP 300*b* exemplifies the modified quantum program after QP 300*a* was manipulated in accordance with the disclosed subject matter. QP 300*b* only requires five qubits ($q_0$, $q_1$, . . . , $q_4$), as two qubits were freed up. It is noted, however, that a potential trade-off has occurred as the reduction in qubits is obtained by increasing the depth of QP 300*b*, which contains more cycles than QP 300*a*.

As can be appreciated, $q_0$, after being processed by $F_1$, is no longer used in QP 300*a*. Accordingly, the intermediate cycle is set to be the cycle after $F_1$ is concluded. A TQP that is data-specific is synthesized and injected in the quantum program so as to cause $q_0$ to change its value from a to c. Similarly, $q_1$ is manipulated by a different TQP to cause its value to change from b to d. Furthermore, and as originally $F_2$ was performed concurrently with $F_1$, QP 300*b* was modified to postpone the operation of $F_2$ to a cycle after the intermediate cycle (and in this case, the cycle immediately after the intermediate cycle). $F_2$ then operates on $q_0$ and $q_1$ instead of $q_3$ and $q_4$, respectively.

As can be appreciated, the output value remains unchanged ($q_6$), but such value is obtained with a reduced number of qubits, and over a larger number of cycles.

It is noted that in some embodiments, the number of cycles in the modified QP may not be larger than those of the original QP.

In some exemplary embodiments, in case the original value of the first input qubit (e.g., $q_0$) is needed again in future cycles, an uncompute may be performed to return to the original value, as is exemplified in QP 300*c*.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), electrical signals transmitted through a wire, Quantum Random Access Memory (QRAM), photons, trapped ions, lasers, cold atoms, or the like.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server (or a group of multiple remote servers). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method comprising:
   obtaining a quantum program to be compiled, wherein the quantum program comprising a first input qubit having a first value and a second input qubit having a second value;
   identifying an intermediate cycle after which the first input qubit is not used in the quantum program;
   synthesizing a transformative quantum program that is applicable on a qubit being processed, wherein the transformative quantum program is a quantum program that is configured to update a value of the qubit being processed by subtracting from the qubit being processed the first value and by adding to the qubit being processed the second value, wherein said synthesizing is based on the first value and based on the second value, whereby performing controlled propagation on the qubit being processed having the first value and updating the qubit being processed to have the second value;
   updating the quantum program, wherein said updating the quantum program comprises:
      modifying the quantum program to perform the transformative quantum program on the first input qubit at the intermediate cycle;
      causing the quantum program to utilize the first input qubit instead of the second input qubit.

2. The method of claim 1 further comprises verifying that the first value and the second value have a same computational base.

3. The method of claim 1,
   wherein said identifying comprises determining that the quantum program does not define a computation on the second input qubit having the second value at a cycle prior to the intermediate cycle,
   wherein said causing the quantum program to utilize the first input qubit instead of the second input qubit comprises replacing usage of the second input qubit by the first input qubit.

4. The method of claim 1,
   wherein said identifying comprises determining that a computation on the second input qubit having the second value at a cycle prior to the intermediate cycle can be delayed to a delayed cycle after the intermediate cycle;
   wherein said causing the quantum program to utilize the first input qubit instead of the second input qubit comprises updating the quantum program to perform the computation at the delayed cycle and using the first input qubit instead of the second input qubit.

5. The method of claim 1 further comprising generating an executable quantum circuit based on the updated quantum program.

6. The method of claim 5 further comprising executing the executable quantum circuit using a quantum computer, whereby reducing qubit resources allocated for the quantum program when executed by the quantum computer.

7. The method of claim 1, wherein said updating is configured to remove all usages of the second input qubit from the quantum program, whereby reducing a number of logical qubits defined by the quantum program.

8. The method of claim 1, wherein the first input qubit is an input to a first functional block in the quantum program, wherein the second input qubit is an input to a second functional block in the quantum program.

9. The method of claim 1 further comprising verifying that the first input qubit is not entangled in the intermediate cycle with any other qubit of the quantum program.

10. The method of claim 1, wherein the first input qubit comprises a first set of qubits, wherein the second input qubit comprises a second set of qubits.

11. The method of claim 10 further comprising verifying that the first set of qubits is not entangled with any other qubit of the quantum program that is not comprised by the first set of qubits.

12. A non-transitory computer readable medium retaining program instructions, wherein the program instructions are configured, when read, to cause a processor to perform:
  obtaining a quantum program to be compiled, wherein the quantum program comprising a first input qubit having a first value and a second input qubit having a second value;
  identifying an intermediate cycle after which the first input qubit is not used in the quantum program;
  synthesizing a transformative quantum program that is applicable on a qubit being processed, wherein the transformative quantum program is a quantum program that is configured to update a value of the qubit being processed by subtracting from the qubit being processed the first value and by adding to the qubit being processed the second value, wherein said synthesizing is based on the first value and based on the second value, whereby performing controlled propagation on the qubit being processed having the first value and updating the qubit being processed to have the second value;
  updating the quantum program, wherein said updating the quantum program comprises:
    modifying the quantum program to perform the transformative quantum program on the first input qubit at the intermediate cycle;
    causing the quantum program to utilize the first input qubit instead of the second input qubit.

13. The non-transitory computer readable medium of claim 12, wherein the instructions are configured to further cause the processor to perform: verifying that the first value and the second value have a same computational base.

14. The non-transitory computer readable medium of claim 12,
  wherein said identifying comprises determining that the quantum program does not define a computation on the second input qubit having the second value at a cycle prior to the intermediate cycle,
  wherein said causing the quantum program to utilize the first input qubit instead of the second input qubit comprises replacing usage of the second input qubit by the first input qubit.

15. The non-transitory computer readable medium of claim 12,
  wherein said identifying comprises determining that a computation on the second input qubit having the second value at a cycle prior to the intermediate cycle can be delayed to a delayed cycle after the intermediate cycle;
  wherein said causing the quantum program to utilize the first input qubit instead of the second input qubit comprises updating the quantum program to perform the computation at the delayed cycle and using the first input qubit instead of the second input qubit.

16. The non-transitory computer readable medium of claim 12, wherein said updating is configured to remove all usages of the second input qubit from the quantum program, whereby reducing a number of logical qubits defined by the quantum program.

17. The non-transitory computer readable medium of claim 12, wherein the first input qubit is an input to a first functional block in the quantum program, wherein the second input qubit is an input to a second functional block in the quantum program.

18. An apparatus comprising a processor and memory unit, wherein the processor is configured to perform:
  obtaining a quantum program to be compiled, wherein the quantum program comprising a first input qubit having a first value and a second input qubit having a second value;
  identifying an intermediate cycle after which the first input qubit is not used in the quantum program;
  synthesizing a transformative quantum program that is applicable on a qubit being processed, wherein the transformative quantum program is a quantum program that is configured to update a value of the qubit being processed by subtracting from the qubit being processed the first value and by adding to the qubit being processed the second value, wherein said synthesizing is based on the first value and based on the second value, whereby performing controlled propagation on the qubit being processed having the first value and updating the qubit being processed to have the second value;
  updating the quantum program, wherein said updating the quantum program comprises:
    modifying the quantum program to perform the transformative quantum program on the first input qubit at the intermediate cycle;
    causing the quantum program to utilize the first input qubit instead of the second input qubit.

* * * * *